United States Patent [19]

Wheaton

[11] 4,150,205

[45] Apr. 17, 1979

[54] COMPOSITE ION EXCHANGE RESINS HAVING LOW RESIDUAL AMOUNTS OF QUATERNARY AMMONIUM CATION

[75] Inventor: Robert M. Wheaton, Walnut Creek, Calif.

[73] Assignee: The Dow Chemical Company, Midland, Mich.

[21] Appl. No.: 874,294

[22] Filed: Feb. 1, 1978

[51] Int. Cl.$^2$ ............................................. B01D 15/04
[52] U.S. Cl. ...................................... 521/28; 260/886
[58] Field of Search ................ 260/2.1 R, 2.1 M, 886; 521/28

[56] References Cited

U.S. PATENT DOCUMENTS

| | | | |
|---|---|---|---|
| 3,041,292 | 6/1962 | Hatch | 260/2.1 R |
| 3,078,140 | 2/1963 | Hatch | 260/2.2 R |
| 3,205,184 | 9/1965 | Hatch | 260/2.2 R |

FOREIGN PATENT DOCUMENTS 575049  4/1957  Canada ................................ 260/2.1

OTHER PUBLICATIONS

Preparation and Use of Snake-Cage Polyelectrolytes Hatch et al., Industrial and Engineering Chem., vol. 49, pp. 1812–1819.

Primary Examiner—Joseph L. Schofer
Assistant Examiner—Peter F. Kulkosky
Attorney, Agent, or Firm—G. D. Street

[57] ABSTRACT

Improved composite ion exchange resin bodies comprising a reaction product of an ingredient containing carboxylate anions polymerized within a strong base anion exchange resin, said resin bodies having low residual amounts of quaternary ammonium cation not intimately associated with said carboxylate anions to minimize inorganic chloride and chlorate anion leakage in ion exchange column operation.

8 Claims, No Drawings

COMPOSITE ION EXCHANGE RESINS HAVING LOW RESIDUAL AMOUNTS OF QUATERNARY AMMONIUM CATION

BACKGROUND OF THE INVENTION

The present invention concerns improved ion-exchange resin bodies useful in the treatment of alkali metal solutions to remove undesired chlorate and chloride ions therefrom.

Composite ion exchange resin bodies and their use in separating solutes, at least one of which is ionizable, from solutions thereof, including salt impurities from alkali metal solutions, are known in the art and are often referred to as "snake cage polyelectrolytes." See, for example, U.S. Pat. Nos. 3,078,140, 3,041,292, Canadian Patent No. 575,049 and the Hatch et al publication entitled "Preparation and Use of Snake-cage Polyelectrolytes," Ind. and Eng. Chem., Vol. 49, pp. 1812–1819, 1957. The '049 Canadian patent teaches that chloride and chlorate ions can be absorbed from solutions containing about 30 to about 50 weight per percent sodium hydroxide to permit recovery of a purified solution. However, it has been discovered that use of the known snake-cage polyelectrolyte resins are not effective in treating certain alkali metal solutions, particularly sodium hydroxide solutions of from about 15 to about 35 weight percent sodium hydroxide, to obtain a purified solution containing acceptably low levels of salt impurities.

SUMMARY OF THE INVENTION

Accordingly, this invention is directed to improved composite, amphoteric ion-exchange resin bodies, which comprise two or more intimately associated and molecularly entangled resins, at least one of which is an insoluble, cross-linked resin containing quaternary ammonium radicals as anion-exchanging groups and one of which is a normally water-soluble, ionizable and polymerizable ingredient which contains ionizable carboxylate radicals as a cation-exchanging groups and which is insolubilized by polymerization within the insoluble, cross-linked resin, wherein residual amounts of quaternary ammonium cation not intimately associated with carboxylate anions in said composite resin bodies are maintained at about or below 0.02 milliequivalent/milliliter (meq/ml) of bulk resin body volume, are highly effective in absorbing chloride and chlorate ions from aqueous alkali metal solutions, thereby permitting the recovery of a purified alkali metal solution.

The absorbed anion impurities can thereafter be washed from the composite resin bodies so as to regenerate the same, and the process can be repeated in alternating absorption and regeneration cycles.

DETAILED DESCRIPTION OF THE INVENTION

The compositions of the present invention are solid, insoluble, composite ion-exchange resin bodies which comprise at least two intimately associated resin ingredients, including an insoluble, cross-linked resin ingredient which contains quaternary ammonium cations as anion-exchanging groups, and a polymerized ingredient which contains ionizable carboxylate anions as cation-exchanging groups, residual amounts of quaternary ammonium cation not intimately associated with said carboxylate anions in said composite resin bodies being maintained at about or below 0.02 meq/ml of bulk resin body volume. The ingredient containing the carboxylate anions (hereinafter referred to as the "carboxylate carrier"), is normally water-soluble, but is insolubilized by polymerization in situ within the insoluble, cross-linked ingredient, after being absorbed into interstices thereof.

The composite ion-exchange resins of the present invention are improved resins of the type described in U.S. Pat. No. 3,041,292, the entire teachings of which are herein incorporated by reference, and known in the art as "snake-cage polyelectrolyte" resins. The composite ion-exchange resins are preferably prepared by admixing a liquid carboxylate carrier with the insoluble cross-linked resin which absorbs the carboxylate carrier. A catalyst, if desired, can be added after the insoluble, cross-linked resin has absorbed at least a portion of the carboxylate carrier. The reaction mixture is then generally heated in the presence of a liquid carrier medium or maintained at a temperature such as to convert the absorbed carboxylate carrier to a polymeric material. Usually, the reaction mixture is heated at temperatures of from 40 to 100°C. to accomplish a fairly rapid reaction rate.

In the polymerization of the carboxylate carrier with a cross-linked quaternary ammonium anion exchange resin, a certain balance of excess + and − sites (on a molecular scale) have been found to exist as a perfect balance of sites (on a gross or localized basis) cannot be achieved. Such excesses can be measured in ion-exchange capacity units (milliequivalents per wet milliliter, meq/ml of resin) and reported as $\Delta C^+$ and $\Delta C^-$, both components ordinarily being present in any given preparation because of localized excesses. The magnitudes of these $\Delta C^+$ and $\Delta C^-$ aspects have been found to have significant impact on the performance of the composite resin in removal of the salt impurities from certain alkali metal solutions as well as on the regenerative properties of the resin. Accordingly, it is critical and essential in the preparation of composite resins of the present invention that levels of quaternary ammonium ion capacity in excess of the carboxylate ion capacity of the composite resin be minimized at any locale within a given composite resin body. Thus, in the present invention, the $\Delta C^+$ must be about or less than 0.02 meq/ml, preferably about or less than 0.01 meq/ml of bulk resin volume. While the $\Delta C^-$ level is not as critical as the $\Delta C^+$ level, it is preferably maintained at less than about 1.0, most preferably less than about 0.5 meq/ml of bulk resin volume.

The best mode for preparing the composite resins of the present invention comprises polymerizing said carboxylate carrier, which can be acrylic acid, methacrylic acid, maleic acid and like materials, within any known strong base, cross-linked anion exchange resin containing quaternary ammonium radicals, such as, for example, any of those noted in the referenced U.S. Pat. No. 3,041,292. Illustrative known cross-linked anion exchange resins which can be employed herein include, for example, DOWEX 1 ® and DOWEX SBR ® (available from The Dow Chemical Company), AMBERLITE IRA 400 ® (manufactured by Rohm & Haas Co.), IONAC A 540 ® (manufactured by Ionac Chemical Co.) and DUOLITE A 101 D ® (manufactured by Diamond Shamrock Co.). Preferably, the anion exchange resin is a cross-linked copolymer of a major proportion of styrene and minor proportions of ethylvinylbenzene and di-vinylbenzene. The level of $\Delta C^+$ in the composite resin is dependent upon the initial resin matrix, reaction conditions and ratio of carboxylate carrier to cross-linked resin employed, with $\Delta C^+$ varying inversely with the carboxylate carrier level employed. Generally, a carboxylate carrier:cross-linked resin equivalent ratio above 1.5:1.0 is employed to obtain a composite resin product having the requisite $\Delta C^+$ level.

The $\Delta C^+$ level can be determined by an analytical method which comprises treating the prepared composite resin with a dilute (about 4%) sodium hydroxide solution to neutralize all carboxylic acid groups, then placing a 5.0 ml sample of the composite resin in a column. The sample is rinsed slowly with 50 ml of a 6% sodium chloride solution, followed by 1000 ml of de-ionized water at a rate of 20 ml/minute. The resin is then transferred to a beaker, slurried with 50 ml of water and 5 ml of 10% $H_2SO_4$, and titrated potentiometrically in a known manner for chloride ion using a standardized silver nitrate solution.

The $\Delta C^-$ level can be calculated by placing 5.0 ml of the resin (treated with sodium hydroxide as with the $\Delta C^+$ test above) in a column and rinsing the same first with 50 ml of a 6% NaCl solution, followed in sequence by 50 ml of water, 100 ml of 0.1N $CaCl_2$ at 3–5 ml/min., and 1000 ml of de-ionized water at 10–20 ml/min. The resin is then rinsed slowly with 50 ml of 1.0N HCl followed by 50 ml of water, with all eluate being collected, adjusted to a pH of 6–8, and then titrated for $Ca^{++}$ using known versene hardness titration, the results being reported in meq/ml.

The $\Delta C^-$ level can also be determined in an "indirect" method which comprises placing a 3–7 ml sample of resin in 25 ml of 1N HCl and $C^-$ for 30 minutes at ambient temperatures. The mixture is filtered and the solids washed with 50 ml absolute methanol, with all the filtrate being collected and diluted to 250 ml. Aliquots of diluted filtrate are then titrated for $Cl^{31}$ and $H^+$ and the total $Cl^-$ and $H^+$ caluclated in meq/ml. The difference between the $H^+$ and total $Cl^-$ uptake (i.e., $H+Cl^-$) equals the $\Delta C^-$ level. $H+Cl^-$ In an alternative method, the composite resin of the present invention may be obtained by heating a composite resin having higher $\Delta C^+$ with aqueous caustic solution. In representative operations, such a composite resin having a high $\Delta C^+$, for example, 0.20 meq/ml, was heated in a dilute (4%) aqueous sodium hydroxide solution at temperatures of about 75–85° C. for a period of about 4 hours and then at temperatures of 100–105° C. for about 2 hours, thus giving a composite resin having a required $\Delta C^+$ level below about 0.02 meq/ml. Those skilld in the art will be able to readily ascertain optimum conditions for preparing desired composite resins from other resins having high $\Delta C^+$ levels in this alternative mode.

Use of Composite Resins

The composite resins of the present invention can be employed in processes for the separation of undesired salt impurities from alkali metal solutions to obtain desired, highly purified solutions. The use of composite ion-exchange resins in methods of separating solutes in a solution is generally known as noted in the art cited in the Background hereof, particularly in U.S. Pat No 3,078,140, the disclosure of which is incorporated herein by reference, and in Canadian Pat. No. 575,049. However, the improved resins of the present invention provide a solution to the problem of excessive salt leakage encountered with prior art resins where highly purified alkali metal solutions, such as sodium and potassium hydroxide, sodium and potassium carbonate, and the like, are desired for various uses, such as rayon manufacture, anion resin regeneration, etc. The impure or salt contaminated solutions which can be treated with the resins of the present invention typically contain as much as 20 grams or more per liter of chlorate and/or chloride ions, the concentration of which can be reduced to 100 ppm or less in the treated, highly purified solution.

The improved composite resins of the present invention can thus be employed in the treatment of alkali metal hydroxide solutions, e.g., those containing from about 5 to about 35 weight percent sodium hydroxide, or equivalent alkali metal hydroxide solutions (e.g., from 10 to 15 percent for lithium hydroxide, etc.), or the treatment of alkali metal carbonate solutions containing from about 5 to about 35 weight percent alkali metal carbonate. Based on the discovery that a separation factor of salt removal from sodium hydroxide (on a resin bed volume comparison) continues to improve with increasing sodium hydroxide concentration to a point of about 25–30 weight percent sodium hydroxide, then declines rapidly thereafter with increasing sodium hydroxide concentration, it is a preferred embodiment that sodium hydroxide solutions of from about 15 to about 35 weight percent sodium hydroxide be treated with the improved resins of the present invention. From an economical viewpoint, it is highly preferred that sodium hydroxide solutions having a concentration of from about 20 to about 30 weight percent be treated with the resins of the present invention. Further, it is preferred that the resins herein be used to obtain purified alkali metal solutions having a residual chlorate and/or chloride ion level of about 100 ppm or less.

In using the resins of the present invention, the amount, rate and duration of contact of the impure solution with the resin will vary according to solution concentration, level of salt impurity thereof, level of purity desired, resin capacity, resin rating, and like factors and can be readily calculated according to procedures well known to those skilled in the art. Temperatures in the range of from about 20 to about 60° C. are usually employed; lower temperatures may cause poor separation due to diffusion problems while higher temperatures cause resin degradation. In operation, the resins herein chemically absorb the chlorate or chloride ion impurities when contacted with a salt contaminated solution, allowing recovery of a purified solution. The absorbed impurities can thereafter be eluted, e.g., removed, from said resin by water extraction, thus regenerating the resin for subsequent uses. The absorption and elution operations are preferably cyclically alternated, i.e., when the resin capacity for chemically absorbing chloride and/or chlorate ions from a solution with which it has been contacted has been reached, or when undesired salt levels in the treated product begin to appear, the feed solution is stopped and water is fed to the resin until said ions are displaced, with the cyclic operation then being repeated. In other procedures, the resin can be circulated as a stream of granular material, first into contact with a stream of the impure or crude solution, then into contact with a stream of wash water or other suitable material to remove the absorbed ions therefrom. The relatiave rates of contact or circulation of resin and crude solution can be regulated by those skilled in the art to obtain optimum separation of chloride and/or chlorate ions. relative The following examples illustrate the present invention, but are not to be construed as limiting the scope thereof.

Example 1

This example illustrates the preparation of a composite ion-exchange resin of the present invention having the desired $\Delta C^+$ level.

175 grams of water, 250 grams of an amine-derived styrene divinylbenzene copolymer (97% styrene, 2% divinylbenzene, 1% ethylvinylbenzene, 20-50 mesh, and 72 grams of acrylic acid (acrylic acid:styrene copolymer equivalent ratio of 1.8:1.0) were mixed in a flask equipped with a Skidmore stirrer, Glascol mantle and temperature control and stirred at ambient temperature for a period of one hour. 7.2 grams of $Na_2S_2O_8$ catalyst were then added and the reaction mixture stirred for about an hour and a half, after which gentle heating thereof was commenced, the reaction temperature being increased from about 25° C. to a high of about 78° C. over a period of about one-half hour. The reaction temperature was then maintained at about 70° C. with stirring for a period of about 18 hours. Additional water and sufficient $Na_2CO_3$ to neutralize the reaction mixture were then added slowly and heating discontinued. The resulting mixture was stirred for an additional 6 hours without heating and then filtered. The recovered resin solids were washed with water and dried.

Analysis of the resin beads indicated a $\Delta C^+$ level of 0.010 meq/ml and a $\Delta C^-$ level of 0.55 meq/ml. Treatment of a 25% sodium hydroxide solution containing 7 gms/l of NaCl with the recovered resin was then carried out, with the purity of salt in the treated product and absorption properties of the resin being determined. The absorption capability of the resin is defined as the separation factor, which is expressed in terms of resin bed volumes and is determined by the difference in bed volumes between the midpoints of the leading edges of sodium hydroxide and salt effluent concentration waves derived by plotting the ratios of concentration out/concentration in versus Bed volumes (effluent volume/resin volume). The greater the separation factor, the greater the capacity of the resin to absorb salt impurities. In carrying out the treatment operation, about 100 ml of the resin product were placed in a fixed bed resin column about 91 cms by about 1.2 cms in diameter and the contaminated sodium hydroxide solution was fed therethrough at a rate of about 4 ml per minute at a temperature of about 50° C., a total of about 290 ml of the solution being fed through the column.

As a result of such operations, the prepared resin was found to provide a large portion of highly purified sodium hydroxide product containing about 100 ppm chloride and to have a large separation factor of about 2.4 bed volumes, the point where increased salt breakthrough was experienced.

In operations similar to the above procedures, other composite ion-exchange resins of the present invention were prepared and tested. The results of such operations are set forth below in Table I:

TABLE I

| Run No. | a* Resin | Salt Removal From 25% NaOH Containing 7 gms/l NaCl | | | |
|---|---|---|---|---|---|
| | | $\Delta C^+$ meq/ml | $\Delta C^-$ meq/ml | ppm[b] salt | S.F.[c] |
| 1. | A | 0.007 | 0.45 | 50 | 2.9 |
| 2. | B | <0.001 | 1.03 | <50 | 1.6 |
| 3. | C | 0.03 | 0.39 | 400 | 2.9 |
| 4. | D | 0.025 | 0.11[d] | 300 | 3.5 |

[a]*Resins A-D prepared by reacting acrylic acid and a styrene-divinylbenzene copolymer (styrene - 87%, divinylbenzene - 8%, ethylvinylbenzene - 5%), 50-100 mesh.
[b]ppm salt in treated solution.
[c]separation factor based on bed volumes.
[d]calculated by direct $Ca^{++}$ method, all other $\Delta C^-$ calculations based on indirect method.

The foregoing data indicate the importance of maintaining the $\Delta C^+$ level below about 0.02 meq/ml where highly purified NaOH solutions (i.e., those containing 100 ppm or less salt) are desired. Although the S.F. of Resins A and B is quite acceptable, it is noted that Resin A (as well as Resin C) were underloaded and that the actual S.F. for each is higher. The higher $\Delta C^-$ level of Resin B, while not affecting product purity, was thought to contribute to the salt breakthrough after 1.6 bed volumes of treatment.

Example 2

In a manner similar to Example 1, 175 grams of water, 250 grams (0.5 mole) of an amine-derived styrene divinylbenzene copolymer (styrene, 85 wt. %; divinylbenzene, 7.5 wt. %; ethylvinylbenzene, 7.5 wt. %) and 60 grams (0.83 mole) glacial acrylic acid (equivalent ratio acrylic acid: styrene copolymer = 1.66:1.0) were mixed with stirring for a period of about 85 minutes at ambient temperatures. 6.0 grams of $Na_2S_2O_8$ catalyst were added and the mixing continued for about 40 minutes. The reaction mixture was then heated gently. Exotherm heating commenced at about 55° C., attaining a maximum at about 80° C. The reaction mixture was then maintained with stirring at about 70° C. for 17 hours. Water and sodium carbonate were then slowly added until the reaction mixture was neutralized, after which the mixture was stirred for about 150 minutes. The reaction mixture was then filtered and the resin solids washed, dried and analyzed for $\Delta C^+$ and $\Delta C^-$. Since the resin was found to have a $\Delta C^+$ of 0.2 meq/ml, the resin was further heated in a 4% sodium hydroxide solution, at 75-85° C. for about 4-½ hours and then at about 100-105° C. for about 2 hours to neutralize localized, unassociated excesses of quaternary ammonium ions. As a result of such operations, a resin having a $\Delta C^+$ of 0.010 and a $\Delta C^-$ of 0.46 meq/ml, based on bulk resin volume, was obtained.

About 100 ml of the resin thus obtained was placed in a fixed bed column 91 cms by 1.2 cm in diameter and a 25% sodium hydroxide solution containing 7 gm/l chloride was fed through the resin column at a rate of 4 ml/min and at a temperature of about 50° C. No salt was detected in the NaOH product stream after passage of the first 1.2 bed volume of solution, with a salt level of about 60 ppm being noted after passage of about 1.5 bed volumes. The resin had a high S.F. (determined as in Example 1) of greater than about 3.0.

This example demonstrates the alternative mode of preparing a composite ion-exchange resin having requisite $\Delta C^+$ levels below about 0.02 meq/ml and further illustrates the obtention of a high purity NaOH solution therewith.

Example 3

The following data illustrates the unique properties of the resins of the present invention in purifying alkali metal solutions.

In further operations, a number of NaOH solutions containing appreciable levels of NaCl were separately fed to a fixed resin bed column as described in Example 1 and containing a composite ion-exchange resin having a $\Delta C^+$ of about 0.02 Meq/ml or less. Introduction of each feed solution to the resin column was continued until the effluent volume equaled at least one-half the volume fed. A separation factor (S.F.) expressed in resin bed volumes as in above examples was determined for each feed solution. Based on such studies, it was discovered that good salt removal from the NaOH solutions was achieved at sodium hydroxide concentrations ranging from 5 to about 35 wt. %, while optimum separation was observed in the 25 to 30% range (S.F. >4.0). The separation factor declined rapidly above about 30 wt. % NaOH (S.F. of 50% NaOH being about 0.3).

Operation of a large, fixed resin bed column containing 50 cubic feet of a resin of the present invention has also been used in a continuous cyclical operation (sequence of feed solution followed by water wash to regenerate the resin) to prepare a highly purified NaOH product containing less than 100 ppm chloride and/or chlorate ions from a 25 wt. % NaOH feed solution containing 6000–7000 ppm NaCl and about 3000 ppm sodium chlorate.

Although this invention is described with respect to specific embodiments and illustrations, the details thereof are not to be construed as limitations except to the extent indicated in the following claims.

What is claimed is:

1. A solid, composite ion exchange resin which comprises at least two intimately associated resin ingredients, including an insoluble, cross-linked resin ingredient which contains quaternary ammonium cations as anion-exchanging groups, and a polymerized ingredient which contains ionizable carboxylate anions as cation-exchanging groups, residual amounts of quaternary ammonium cation not intimately associated with said carboxylate anions in said composite resin bodies being maintained at about or below 0.02 meq/ml of bulk resin body volume.

2. The resin body of claim 1 wherein the residual amount of the quaternary ammonium cations in said composite resin body is maintained about or below 0.01 milliequivalents per milliliter.

3. The resin body of claim 1 wherein the ingredient containing ionizable carboxylate anions is polyacrylic acid.

4. The resin body of claim 1 wherein the ingredient containing quaternary ammonium cations is a cross-linked copolymer of a major proportion of styrene and minor proportions of ethylvinylbenzene and divinylbenzene.

5. The resin body of claim 3 wherein the ingredient containing quaternary ammonium cations is a cross-linked copolymer of a major proportion of styrene and minor proportions of ethylvinylbenzene and divinylbenzene.

6. The resin body of claim 2 wherein the ingredient containing ionizable carboxylate anions is polyacrylic acid.

7. The resin body of claim 2 wherein the ingredient containing quaternary ammonium cations is a cross-linked copolymer of a major proportion of styrene and minor proportions of ethylvinylbenzene and divinylbenzene.

8. The resin body of claim 7 wherein the ingredient containing quaternary ammonium cations is a cross-linked copolymer of a major proportion of styrene and minor proportions of ethylvinylbenzene and divinylbenzene.

* * * * *

UNITED STATES PATENT AND TRADEMARK OFFICE
CERTIFICATE OF CORRECTION

PATENT NO. : 4,150,205
DATED : April 17, 1979
INVENTOR(S) : Robert M. Wheaton

It is certified that error appears in the above-identified patent and that said Letters Patent are hereby corrected as shown below:

Column 3, line 33, delete "$C^-$" and insert -- stirring -- ;

Column 3, line 37, delete "$Cl^{31}$" and insert -- $Cl^-$ -- ;

Column 3, line 40, after the period delete "$H^+Cl^-$";

Column 4, line 68, after the period delete "relative";

Column 5, line 20, delete "25°" and insert -- 26° -- .

*Signed and Sealed this*

*Eleventh* Day of *September 1979*

[SEAL]

Attest:

LUTRELLE F. PARKER

*Attesting Officer*   *Acting Commissioner of Patents and Trademarks*